(12) United States Patent
Hartig et al.

(10) Patent No.: US 11,828,346 B2
(45) Date of Patent: Nov. 28, 2023

(54) VIBRATION DAMPERS AND DAMPER TUBES FOR VIBRATION DAMPERS

(71) Applicants: ThyssenKrupp Bilstein GmbH, Ennepetal (DE); thyssenkrupp AG, Essen (DE)

(72) Inventors: Ulrich Hartig, Mandern (DE); Freddy Woenarta, Braunschweig (DE); Moritz Froese, Düssseldorf (DE); Andreas Müller, Wadgassen (DE); Mike Malburg, Grimburg (DE); Jürgen Schneider, Iserlohn (DE)

(73) Assignees: ThyssenKrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 49 days.

(21) Appl. No.: 17/406,254

(22) Filed: Aug. 19, 2021

(65) Prior Publication Data

US 2022/0056978 A1 Feb. 24, 2022

(30) Foreign Application Priority Data

Aug. 19, 2020 (DE) .................... 10 2020 210 538.3

(51) Int. Cl.
*F16F 9/36* (2006.01)
*F16F 9/18* (2006.01)
(Continued)

(52) U.S. Cl.
CPC ................ *F16F 9/369* (2013.01); *F16F 9/18* (2013.01); *F16F 9/3235* (2013.01); *F16F 9/34* (2013.01);
(Continued)

(58) Field of Classification Search
CPC .. F16F 9/369; F16F 9/18; F16F 9/3235; F16F 9/34; F16F 9/48; F16F 2222/12;
(Continued)

(56) References Cited

U.S. PATENT DOCUMENTS 3,589,702 A * 6/1971 Spieth ..................... F16F 9/062
267/64.15
3,605,960 A * 9/1971 Singer ....................... F16F 9/48
188/314

(Continued)

FOREIGN PATENT DOCUMENTS

CN 103443499 A 12/2013
CN 107882912 A 4/2018
(Continued)

*Primary Examiner* — Robert A. Siconolfi
*Assistant Examiner* — James K Hsiao
(74) *Attorney, Agent, or Firm* — thyssenkrupp North America, LLC

(57) ABSTRACT

A vibration damper for a vehicle may include an outer tube, a middle tube, and an inner tube arranged coaxially. A seal receiving element may be arranged between the inner tube and the middle tube on each side of a middle tube opening facing towards tube ends of the middle tube. A radially encircling sealing element may be arranged in the seal receiving element, and the sealing element may seal the middle tube compensation space relative to the outer tube compensation space at least with respect to damping medium. The seal receiving element may be configured at least partially as a coating element. The coating element may be disposed on the inner tube or the middle tube in a substance-to-substance bonded manner.

17 Claims, 1 Drawing Sheet

(51) Int. Cl.
  *F16F 9/32* (2006.01)
  *F16F 9/34* (2006.01)
  *F16F 9/48* (2006.01)
  *B60G 17/08* (2006.01)
  *B60G 13/08* (2006.01)

(52) U.S. Cl.
  CPC ............... *F16F 9/48* (2013.01); *B60G 13/08* (2013.01); *B60G 17/08* (2013.01); *F16F 2222/12* (2013.01); *F16F 2226/048* (2013.01); *F16F 2228/066* (2013.01); *F16F 2230/30* (2013.01); *F16F 2230/36* (2013.01); *F16F 2232/08* (2013.01); *F16F 2234/02* (2013.01)

(58) Field of Classification Search
  CPC ........... F16F 2226/048; F16F 2228/066; F16F 2230/30; F16F 2230/36; F16F 2232/08; F16F 2234/02; F16F 9/185; F16F 9/064; B60G 13/08; B60G 17/08; B60G 2202/24; B60G 2800/162
  See application file for complete search history.

(56) References Cited

U.S. PATENT DOCUMENTS

| | | | | |
|---|---|---|---|---|
| 5,560,454 A * | 10/1996 | Jensen | ............... | F16F 9/34 188/282.3 |
| 5,649,611 A * | 7/1997 | Nakadate | ............... | F16F 9/46 188/266.6 |
| 5,740,890 A * | 4/1998 | Forster | ............... | F16F 9/325 188/322.13 |
| 5,901,820 A * | 5/1999 | Kashiwagi | ............... | F16F 9/46 188/266.6 |
| 5,960,915 A * | 10/1999 | Nezu | ............... | F16F 9/465 188/266.6 |
| 5,997,256 A * | 12/1999 | Gunther | ............... | F04B 33/005 417/259 |
| 6,283,259 B1 * | 9/2001 | Nakadate | ............... | F16F 9/369 188/299.1 |
| 8,469,162 B2 * | 6/2013 | Nishimura | ............... | F16F 9/325 188/266.2 |
| 10,987,988 B2 * | 4/2021 | Garcia | ............... | B60G 17/08 |
| 2007/0071990 A1 * | 3/2007 | Suman | ............... | B23K 35/36 428/548 |
| 2009/0120749 A1 * | 5/2009 | Kolz | ............... | F16F 9/185 188/322.19 |
| 2009/0206558 A1 * | 8/2009 | Nameki | ............... | F16J 15/164 277/644 |
| 2010/0095837 A1 * | 4/2010 | Suman | ............... | C09D 5/033 524/588 |
| 2010/0263973 A1 * | 10/2010 | Hall | ............... | F16F 9/34 188/313 |
| 2010/0301578 A1 | 12/2010 | Noda | | |
| 2011/0101579 A1 * | 5/2011 | Polakowski | ............... | F16F 9/3235 188/313 |
| 2012/0205843 A1 | 8/2012 | Allen et al. | | |
| 2012/0325603 A1 | 12/2012 | Ootake et al. | | |
| 2013/0260167 A1 * | 10/2013 | Kobayashi | ............... | F16F 9/3235 428/614 |
| 2014/0090938 A1 * | 4/2014 | Nishimura | ............... | F16F 9/369 188/269 |
| 2015/0047935 A1 * | 2/2015 | Godfrey | ............... | B22F 5/106 188/322.19 |
| 2015/0110548 A1 * | 4/2015 | Reid | ............... | B23K 35/362 228/248.1 |
| 2015/0300441 A1 * | 10/2015 | Lun | ............... | F16F 9/062 188/269 |
| 2016/0017951 A1 * | 1/2016 | Matsumoto | ............... | F16F 9/3415 188/314 |
| 2016/0052361 A1 * | 2/2016 | Yamashita | ............... | F16F 9/50 188/266.1 |
| 2016/0059656 A1 * | 3/2016 | Funke | ............... | B60G 13/08 188/267.1 |
| 2017/0021417 A1 * | 1/2017 | Martin | ............... | B29C 64/153 |
| 2017/0299009 A1 * | 10/2017 | Murakami | ............... | F16F 9/435 |
| 2018/0051767 A1 * | 2/2018 | Tanabe | ............... | F16F 9/3235 |
| 2018/0094691 A1 | 4/2018 | Zhu | | |
| 2018/0098919 A1 * | 4/2018 | Pallari | ............... | A61F 13/00063 |
| 2018/0119769 A1 | 5/2018 | Wahl et al. | | |
| 2018/0216524 A1 * | 8/2018 | Lineton | ............... | F01L 3/04 |
| 2018/0266514 A1 * | 9/2018 | Mori | ............... | F16F 15/027 |
| 2019/0323575 A1 * | 10/2019 | Mori | ............... | F16F 9/34 |
| 2021/0078376 A1 * | 3/2021 | Aoki | ............... | F16J 15/002 |
| 2021/0148428 A1 * | 5/2021 | Watanabe | ............... | F16F 1/377 |
| 2021/0317892 A1 * | 10/2021 | Hayase | ............... | F16J 15/062 |
| 2021/0324935 A1 * | 10/2021 | Yamashita | ............... | F16F 9/32 |

FOREIGN PATENT DOCUMENTS

| | | |
|---|---|---|
| CN | 107923471 A | 4/2018 |
| CN | 207176483 U | 4/2018 |
| CN | 207315960 U | 5/2018 |
| DE | 195 08 853 A1 | 8/1996 |
| DE | 10 2010 021 913 A1 | 12/2010 |

\* cited by examiner

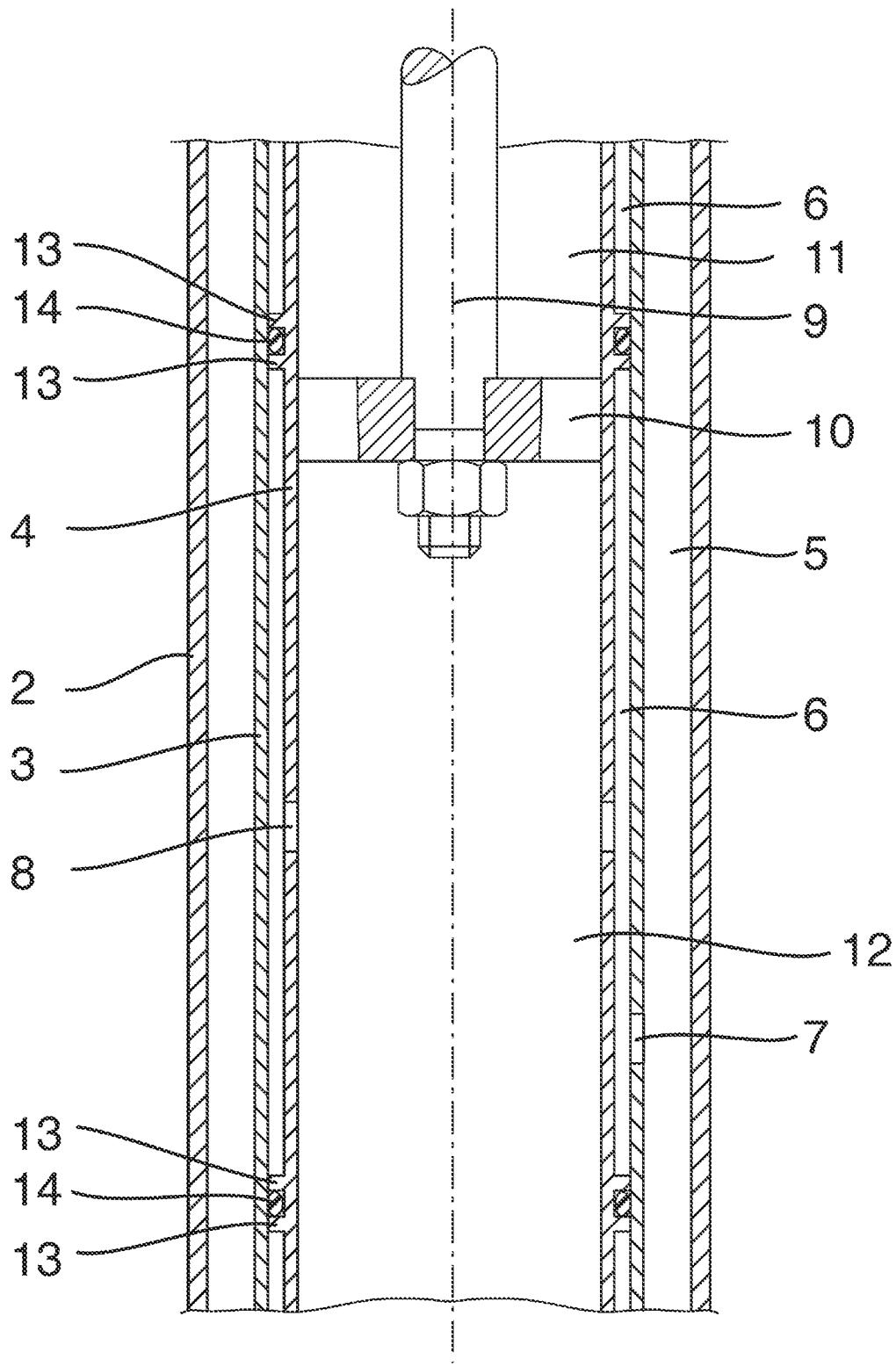

VIBRATION DAMPERS AND DAMPER TUBES FOR VIBRATION DAMPERS

CROSS REFERENCE TO RELATED APPLICATIONS

This application is a U.S. Nonprovisional Applications that claims priority to German Patent Application No. DE 10 2020 210 538.3, filed Aug. 19, 2020, the entire contents of which are incorporated herein by reference.

FIELD

The present disclosure generally relates to vibration dampers and to damper tubes for vibration dampers.

BACKGROUND

Vibration dampers, in particular multi-tube vibration dampers, for motor vehicles are known in the prior art in a multiplicity of embodiments. There are however problems in the provision of vibration dampers, in particular multi-tube vibration dampers, for motor vehicles, and of damper tubes for vibration dampers of motor vehicles, that are assembled in a simple, time-saving manner and are inexpensive to produce and that also meet or exceed the requirements for safety, operability and durability and strength. In particular, the provision of sealing seats on damper tubes, without influencing the static load-bearing capacity, is a challenge.

Thus a need exists for an improved vibration damper, in particular multi-tube vibration damper, and improved damper tubes, in the case of which the disadvantages mentioned above are avoided. In particular, a need exists for an improved vibration damper, in particular multi-tube vibration damper, and an improved damper tube intended to facilitate a simple, in particular modular, and inexpensive design. In addition, a need exists for an improved vibration damper intended to facilitate an improved ease of assembly, in particular production, of the vibration damper. Furthermore, a need also exists for vibration dampers, in particular damper tubes, having sealing seats, wherein the static load-bearing capacity is not influenced or is influenced to only a slight extent.

BRIEF DESCRIPTION OF THE DRAWING

FIG. 1 is a schematic longitudinal sectional view of an example vibration damper in a region of a seal of an inner tube in relation to a middle tube.

DETAILED DESCRIPTION

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art Compared with conventional vibration dampers, the vibration damper according to the disclosure, in particular multi-tube vibration damper, has the advantage of seal seats which do not influence the static load-bearing capacity of the damper tubes or influence it to only a slight extent. The seal seats are also reliably secured in relation to dynamic pressures in the damper. Furthermore, the seal seats produce little noise during operation of the vibration damper, in particular resonant frequencies are excluded due to the lack of relative movements.

Compared with conventional damper tubes, the damper tube according to the disclosure has the advantage of seal seats which do not influence the static load-bearing capacity of the damper tubes or influence it to only a slight extent.

The disclosure therefore provides a vibration damper, in particular a multi-tube damper, for a vehicle, comprising:
an outer tube, at least one middle tube and an inner tube, which are arranged coaxially relative to one another, wherein an outer tube compensation space for receiving damping medium is formed between the outer tube and the at least one middle tube, and at least one middle tube compensation space for receiving damping medium is formed between the at least one middle tube and the inner tube,
wherein the at least one middle tube has at least one middle tube opening for the fluidic through-connection of the outer tube compensation space to the middle tube compensation space, and the inner tube has at least one inner tube opening for the fluidic through-connection of the middle tube compensation space to the interior space of the inner tube,
wherein the inner tube is filled at least partially with damping medium, wherein a piston rod is arranged in the inner tube so as to be movable back and forth, wherein a working piston which is arranged on the piston rod is movable jointly with the piston rod, wherein the interior space of the inner tube is divided into a piston-rod-side working space and a piston-rod-remote working space by the working piston,
wherein at least one seal receiving element is arranged between the inner tube and the at least one middle tube on each side of the middle tube opening, said side facing towards the tube ends of the at least one middle tube, wherein a radially encircling sealing element is arranged in the at least one seal receiving element, said sealing element sealing the at least one middle tube compensation space in relation to the outer tube compensation space at least with respect to the damping medium,
wherein the at least one seal receiving element is configured at least partially in the form of a coating element, and the coating element is arranged on the inner tube or the at least one middle tube in a substance-to-substance bonded manner.

The disclosure further provides a damper tube, in particular an inner tube, a middle tube for a vibration damper, in particular a multi-tube damper, wherein at least one seal receiving element is arranged on the side facing towards a tube end of the damper tube, wherein a radially encircling sealing element is arranged in the at least one seal receiving element, wherein the at least one seal receiving element is configured at least partially in the form of a coating element, and the coating element is arranged on the at least one damper tube in a substance-to-substance bonded manner.

The disclosure further concerns the manufacture of a damper tube, in particular in the form of an inner tube, as a middle tube for producing a vibration damper, in particular a multi-tube vibration damper.

The disclosure may be implemented both in a vibration damper, in particular a multi-tube damper, and in a damper tube and in the use of a damper tube for producing a vibration damper, in particular a multi-tube vibration damper.

The vibration damper according to the disclosure is in particular a multi-tube damper. The damper tube according to the disclosure is in particular an inner tube and/or a middle tube for a vibration damper, in particular a multi-tube damper.

In the context of the present disclosure, a seal receiving element is understood to mean an element on which a sealing element is arranged, in particular can be received, in such a way that the sealing element seals the middle tube compensation space in relation to the outer tube compensation space at least with respect to a damping medium. For example, the seal receiving element may be geometrically configured in such a way that the sealing element is received at least in a form-fitting manner.

In the context of the present disclosure, a coating element is understood to mean an element which is formed by application of one or more firmly adhering layer/layers for example composed of at least one amorphous material to the surface of a damper tube, in particular of an inner tube or of a middle tube, for a vibration damper, in particular a multi-tube damper. For example, the application of one or more firmly adhering layer/layers may be performed by means of build-up welding (cladding), for example laser build-up welding, in particular high-speed laser build-up welding, for example in accordance with DIN 8580, wherein a build-up of volume is effected entirely or partially by a welding filler material, in particular wire or powder. In build-up welding, a surface application is effected by melting and simultaneously applying virtually any desired material to a workpiece, such as for example a damper tube. This may be effected in powder form for example in the form of metal powder or else with a welding wire or welding strip. In laser build-up welding, a high-power laser is used as heat source, in some cases, a diode laser or fibre laser, for example a CO2 or Nd:YAG laser. The build-up welding may be used both for producing layers and freely shaped 2.5D structures (laser generation). In the latter case, it may be categorized as an additive manufacturing process, in particular a 3D printing process.

In the context of the present disclosure, a sealing element is understood to mean an element which is sealed with respect to a damping medium, in particular is impermeable to the damping medium. A sealing element according to the disclosure is for example selected from a group of flat seals, profile seals, sleeve seals, sealing compositions, sealing rings, in particular O-rings, rubber sealing rings, vulcanized rubber sealing rings, polymer sealing rings or a combination thereof.

According to one embodiment of the disclosure, the at least one seal receiving element is configured in the form of two radially encircling ring elements which are arranged parallel to one another and which are spaced apart from one another.

In one embodiment of the disclosure, the at least one middle tube has a shorter tube length than the inner tube.

According to one embodiment of the disclosure, the outer tube compensation space and/or middle tube compensation space are/is arranged concentrically in relation to the inner tube.

According to one embodiment of the disclosure, the at least one seal receiving element is arranged at at least one tube end of the at least one middle tube.

According to one embodiment of the disclosure, the at least one seal receiving element has a recess in which the radially encircling sealing element is at least partially received.

FIG. 1 illustrates a longitudinal section of a vibration damper 1 according to the disclosure in the form of a three-tube damper comprising an outer tube 2, a middle tube 3 and an inner tube 4 in the region of the seal of the inner tube in relation to the middle tube. An outer tube compensation space 5 is arranged in the region between the outer tube 2 and the middle tube 3, and a middle tube compensation space 6 is arranged in the region between the middle tube 3 and the inner tube 4. A piston rod 9 is arranged in the inner tube 4 so as to be movable back and forth, wherein a working piston 10 which is arranged on the piston rod 9 is movable jointly with the piston rod 9, wherein the interior space of the inner tube 4 is divided into a piston-rod-side working space 11 and a piston-rod-remote working space 12 by the working piston 10. The middle tube 3 has a middle tube opening 7 for the fluidic through-connection of the outer tube compensation space 5 to the concentric middle tube compensation space 6. The inner tube 4 has an inner tube opening 8 for the fluidic through-connection of the middle tube compensation space 6 to the interior space of the inner tube 4. The seal receiving element 13 is arranged in the form of a coating element on the inner tube 4 in a substance-to-substance bonded manner and receives the sealing element 14 in the u-shaped recess, wherein the sealing element 14 lies against the inner wall of the middle tube 3 in a sealing manner.

Vibration dampers, in particular multi-tube vibration dampers, and also damper tubes for a vibration damper of the type described above, are used in the production of vibration dampers.

LIST OF REFERENCE DESIGNATIONS

1=Vibration damper
2=Outer tube
3=Middle tube
4=Inner tube
5=Outer tube compensation space
6=Middle tube compensation space
7=Middle tube opening
8=Inner tube opening
9=Piston rod
10=Working piston
11=Piston-rod-side working space
12=Piston-rod-remote working space
13=Seal receiving element
14=Sealing element

What is claimed is:

1. A vibration damper for a vehicle, comprising:
an outer tube, a middle tube, and an inner tube arranged coaxially;
a piston rod arranged in the inner tube so as to be movable back and forth;
a working piston arranged on the piston rod and movable jointly with the piston rod;

an outer tube compensation space for receiving damping medium formed between the outer tube and the middle tube; and a middle tube compensation space for receiving damping medium formed between the middle tube and the inner tube, wherein the middle tube has a middle tube opening for fluidic through-connection of the outer tube compensation space to the middle tube compensation space, wherein the inner tube has an inner tube opening for fluidic through-connection of the middle tube compensation space to an interior space of the inner tube, wherein the inner tube is filled at least partially with damping medium, wherein the interior space of the inner tube is divided into a piston-rod-side working space and a piston-rod-remote working space by the working piston, wherein a seal receiving element is disposed between the inner tube and the middle tube on each side of the middle tube opening facing towards tube ends of the middle tube, wherein a radially encircling sealing element is disposed in the seal receiving element, with the radially encircling sealing element sealing the middle tube compensation space relative to the outer tube compensation space at least with respect to damping medium, wherein the seal receiving element is configured at least partially as a coating element formed by application of at least one firmly adhered layer, with the coating element being disposed on the inner tube or the middle tube in a substance-to-substance bonded manner, wherein the at least one firmly applied layer comprises at least one amorphous material applied on one of the inner tube and middle tube and includes a build-up volume effected by a welding filler material.

2. The vibration damper of claim 1 wherein the seal receiving element is configured as two radially encircling ring elements that are parallel to one another and that are spaced apart from one another.

3. The vibration damper of claim 1 wherein the middle tube has a shorter tube length than the inner tube.

4. The vibration damper of claim 1 wherein at least one of the outer tube compensation space or the middle tube compensation space is arranged concentrically relative to the inner tube.

5. The vibration damper of claim 1 wherein the seal receiving element is disposed at one of the tube ends of the middle tube.

6. The vibration damper of claim 1 wherein the seal receiving element has a recess in which the radially encircling sealing element is at least partially received.

7. The vibration damper of claim 1, wherein the coating element is arranged on the vibration damper in a substance-to-substance bonded manner.

8. The vibration damper of claim 1 wherein the amorphous material is adhered to one of the inner tube and middle tube by build-up welding.

9. The vibration damper of claim 8 wherein the build-up welding comprises high-speed laser build-up welding.

10. The vibration damper of claim 8 wherein the at least one firmly applied layer comprises cladding.

11. The vibration damper of claim 1 wherein the amorphous material is effected entirely by a welding filler material.

12. The vibration damper of claim 11 wherein the welding filler material comprises wire.

13. The vibration damper of claim 11 wherein the welding filler material comprises powder.

14. The vibration damper of claim 1 wherein the coating element is formed exclusively by application of the at least one firmly applied layer.

15. The vibration damper of claim 1, wherein the coating element is formed by laser build-up welding.

16. The vibration damper of claim 1, wherein the radially encircling sealing element includes a two radial portions that contact each other, and is formed exclusively by laser build-up welding, and the sealing member located between the two radial portions.

17. The vibration damper of claim 1, wherein the filler material is wire.

* * * * *